United States Patent
Dmitriev et al.

(10) Patent No.: US 10,168,557 B2
(45) Date of Patent: Jan. 1, 2019

(54) T-SHAPED CIRCULATOR BASED ON A TWO-DIMENSIONAL PHOTONIC CRYSTAL WITH A SQUARE LATTICE

(71) Applicant: UNIVERSIDADE FEDERAL DO PARÁ, Guamá, Belém-Pará (BR)

(72) Inventors: Victor Dmitriev, Belém-Pará (BR); Gianni Masaki Tanaka Portela, Belém-Pará (BR); Leno Rodrigues Martins, Belém-Pará (BR)

(73) Assignee: UNIVERSIDADE FEDERAL DO PARÁ—UFPA (BR)

( * ) Notice: Subject to any disclaimer, the term of this patent is extended or adjusted under 35 U.S.C. 154(b) by 0 days.

(21) Appl. No.: 15/570,294

(22) PCT Filed: Apr. 29, 2016

(86) PCT No.: PCT/BR2016/050098
§ 371 (c)(1),
(2) Date: Oct. 27, 2017

(87) PCT Pub. No.: WO2016/172780
PCT Pub. Date: Nov. 3, 2016

(65) Prior Publication Data
US 2018/0120598 A1    May 3, 2018

(30) Foreign Application Priority Data

Apr. 29, 2015   (BR) .............................. 102015010964

(51) Int. Cl.
*G02B 6/42*     (2006.01)
*G02F 1/095*    (2006.01)
(Continued)

(52) U.S. Cl.
CPC ............ *G02F 1/0955* (2013.01); *B82Y 20/00* (2013.01); *G02B 6/10* (2013.01); *G02B 6/42* (2013.01);
(Continued)

(58) Field of Classification Search
None
See application file for complete search history.

(56) References Cited

U.S. PATENT DOCUMENTS 7,489,846 B2 *   2/2009   Grot ..................... G02B 6/1225
                                                              385/123
8,699,835 B2     4/2014   Ouyang et al. ................. 385/27
(Continued)

FOREIGN PATENT DOCUMENTS

CN    104101947    10/2014    ............. G02B 6/122
CN    104101948    10/2014    ............. G02B 6/122

OTHER PUBLICATIONS

International Search Report and Written Opinion issued in corresponding PCT Appln. Serial No. PCT/BR2016/050098 dated Jul. 27, 2016, with English translation, 15 pgs.
(Continued)

*Primary Examiner* — Tina M Wong
(74) *Attorney, Agent, or Firm* — Hayes Soloway P.C.

(57) ABSTRACT

A two-dimensional photonic crystal formed of a square lattice of dielectric rods immersed in air, in which are inserted, in a controlled manner, defects that originate three waveguides and one resonant cavity. The cavity is formed of a ferrite cylinder with magneto-optical properties, and by two dielectric cylinders located near to the ferrite cylinder. It has the function of transmitting electromagnetic signals in a desired direction (clockwise or counterclockwise), defined by the sign of an external DC magnetic field $H_0$.

2 Claims, 4 Drawing Sheets

(51) Int. Cl.
*B82Y 20/00* (2011.01)
*G02B 6/10* (2006.01)
*G02B 6/122* (2006.01)
*G02B 6/125* (2006.01)

(52) U.S. Cl.
CPC ............ *G02B 6/125* (2013.01); *G02B 6/1225* (2013.01); *G02F 2202/32* (2013.01)

(56) References Cited

U.S. PATENT DOCUMENTS

| | | | |
|---|---|---|---|
| 8,731,360 B2* | 5/2014 | Ouyang | B82Y 20/00 359/321 |
| 9,778,496 B2* | 10/2017 | Dmitriev | G02F 1/095 |
| 2012/0243844 A1* | 9/2012 | Ouyang | B82Y 20/00 385/130 |
| 2012/0251048 A1 | 10/2012 | Ouyang et al. | 385/50 |
| 2013/0223805 A1 | 8/2013 | Ouyang et al. | 385/130 |

OTHER PUBLICATIONS

International Preliminary Report on Patentability issued in corresponding PCT Appln. Serial No. PCT/BR2016/050098 dated Oct. 13, 2017, 5 pgs.

\* cited by examiner

T-SHAPED CIRCULATOR BASED ON A TWO-DIMENSIONAL PHOTONIC CRYSTAL WITH A SQUARE LATTICE

BACKGROUND OF THE INVENTION

The present invention refers to a T-shaped circulator with low symmetry based on a two-dimensional photonic crystal with square lattice.

Photonic crystals are periodic structures built with materials that have different refractive indices. In such structures, there is a forbidden range of frequencies, known as photonic band gap. Electromagnetic waves with frequency located within this range are reflected by the crystal. The occurrence of this phenomenon is exploited for the design of most devices that are based on photonic crystals.

Nonreciprocal components such as circulators and isolators are used in communication systems to reduce undesirable reflections that cause instability in generators and amplifiers, as well as loss of performance in these systems.

Because of the nonreciprocity, circulators carry out the transmission of electromagnetic signals in one direction (clockwise or counterclockwise) determined by the sign (positive or negative) of an applied DC magnetic field. Thus, in a 3-port circulator, for example, there may be the following modes of operation (input port→output port): 1→2, 2→3 and 3→1 (clockwise); or 1→3, 3→2 e 2→1 (counterclockwise). In an ideal circulator, the power of the signal present at the input port is entirely transferred to the output port (without loss).

As a result of researches related to the development of new devices based on photonic crystals, some patents related to circulators based on these structures have been deposited.

For example, the circulator referred in the patent US20120243844 is built on a two-dimensional photonic crystal with triangular lattice, consisting of holes filled with air and etched in a dielectric material. Its resonant cavity is comprised of a magneto-optical rod and of holes with changed diameters (when compared to other holes of the photonic crystal). The device in question has three ports.

The report describing the patent US20120251048 refers to a circulator with four ports, based on the coupling of two resonant cavities. Both cavities are formed by a magneto-optical rod and by holes with modified diameters.

On the other hand, the patent US20130223805 relates to a circulator built on a two-dimensional photonic crystal with square lattice of holes filled with air, etched in a dielectric material. The resonant cavity of this circulator is characterized by having four magneto-optical rods surrounding a central dielectric rod and three dielectric rods with modified diameters.

All these devices are used mainly to perform the isolation function, that is, the protection of signal sources against parasitic reflections coming from not matched loads connected to a communication system.

In a circulator with three ports, for example, assuming that port 1 is connected to a signal source (input), port 2 is connected to the circuit that will receive the signal from the signal source (output), and port 3 is connected to an ideally matched load, the circulator will operate as following.

Considering the clockwise propagation (1→2, 2→3 and 3→1), the signal coming from input (port 1) is sent to output (port 2). However, parasitic reflections that might be originated at the output (port 2) do not return to input (port 1). They will be directed to port 3, in which is connected an ideally matched load that absorb them, protecting the signal source connected to port 1.

SUMMARY OF THE INVENTION

The proposed device, based on photonic crystal technology, can be built with reduced dimensions, favoring an increase in the integration density of components in communication systems.

When compared to the aforementioned circulators, the present circulator has a resonant cavity with simplified geometry, making it more feasible from the point of view of construction and mass production. Moreover, it has reduced losses.

The magnetization circuit of the proposed circulator is simplified, since the circulator in question operates with uniform magnetization and an electromagnet is able to fulfill this function. The intensity of the magnetic field generated by the electromagnet is proportional to the intensity of the current flowing through it.

Among the performance characteristics of the developed circulator, there are the low insertion losses between input and output, high isolation levels in relation to parasitic reflections arising from the output and the wide operating band.

In general, the developed device is based on a two-dimensional photonic crystal composed of a square lattice of dielectric rods immersed in air. In this crystal, two types of defects are inserted, namely:

a) Removal of rows of rods (linear defects), which originates the waveguides;

b) Changes in radius, position and refractive index of the dielectric rods located in the center of the device (local defects), which originate its resonant cavity.

More specifically, the device has the following characteristics:

a) At the operating central frequency 100 GHz, the lattice constant of the crystal (a) is equal to 1.065 mm;

b) The radius of the cylinders belonging to the crystal lattice is equal to 0.2a;

c) The three waveguides are inserted through the creation of three linear defects;

d) The resonant cavity is formed by a central cylinder and two ferrite cylinders near this dielectric with increased diameter. The central cylinder is made from a nickel-zinc based ferrite, and it is inserted into a displaced position in relation to the horizontal axis of the waveguide.

e) The ferrite is a gyrotropic material being described by the following expressions for the permittivity and the magnetic permeability:

$$\varepsilon = 12,5\varepsilon_0; [\mu] = \mu_0 \begin{pmatrix} \mu & -ik & 0 \\ ik & \mu & 0 \\ 0 & 0 & \mu \end{pmatrix} \quad \text{f)}$$

Where:

a) $\varepsilon$ is the electrical permittivity of the material (in Farads per meter);

b) $\varepsilon_0$ is the permittivity of free space (in Farads per meter);

c) $[\mu]$ is the magnetic permeability tensor of the material (in Henrys per meter);

d) $\mu_0$ is the magnetic permeability of free space (in Henrys per meter);

e) i is the imaginary unit;

f) μ is a parameter that can be calculated from the following formula:

$$\mu = 1 + \frac{\omega_m(\omega_i + j\omega\alpha)}{(\omega_i + j\omega\alpha)^2 - \omega^2}; \qquad \text{g)}$$

h) k is a parameter that can be calculated from the following formula:

$$k = \frac{\omega_m \omega}{(\omega_i + j\omega\alpha)^2 - \omega^2}; \qquad \text{i)}$$

j) The parameters $\omega_m$ and $\omega_i$ are defined by the following formulas:

k) $\omega_m = \gamma M_0$ and $\omega_i = \gamma H_0$;

l) $M_0$ is the saturation magnetization (398 kA/m), γ is the gyromagnetic ratio (2.33×10⁵ rad/s per A/m), α is the damping factor (0.03175), ω is the angular frequency (rad/s) and $H_0$ is the applied DC magnetic field (kA/m).

m) The value of the ratio "k/μ" is equal to 0.17.

DETAILED DESCRIPTION OF THE INVENTION

Figure 1:
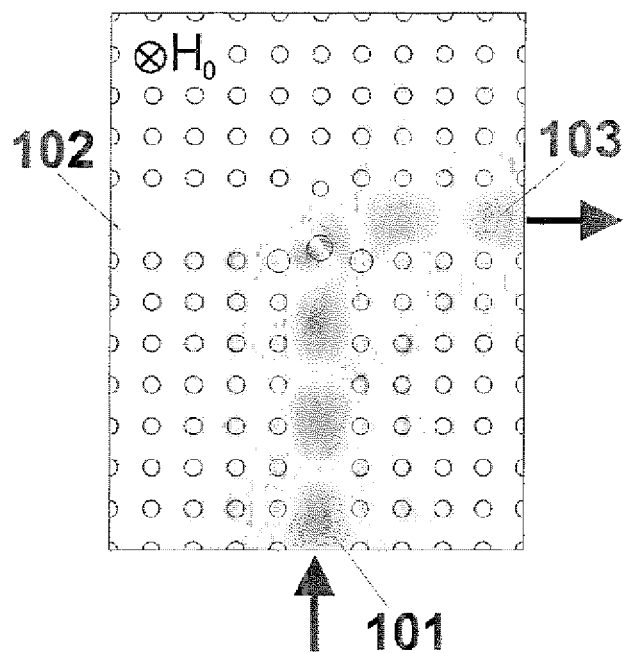
FIG. 1 shows the $E_z$ component of the electromagnetic field in the device when the input signal is applied to the waveguide 101.

When the excitation is applied at port 1 (associated with the waveguide 101), it occurs the signal transmission from this port to port 3 (associated with the waveguide 103), with isolation of port 2 (associated with the waveguide 102) due to the special alignment of the dipole mode, as can be seen in FIG. 1; Similarly, when the input signal is applied in ports 2 (FIGS. 2) and 3 (FIG. 3), it is transferred to ports 1 (with isolation of port 3) and 2 (with isolation of port 1), respectively. This case corresponds to the propagation in counterclockwise direction. If the sign of the external DC magnetic field $H_0$ is inverted, the signal propagation takes place in the clockwise direction (1→2, 2→3 and 3→1).

Figure 2:
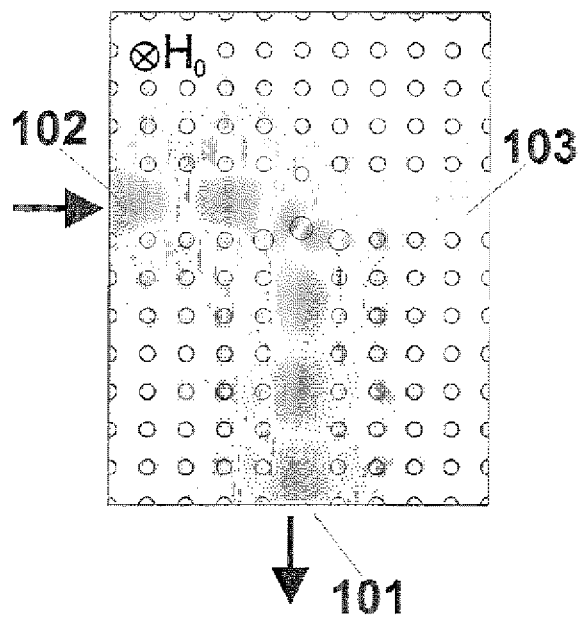
FIG. 2 shows the $E_z$ component of the electromagnetic field in the device when the input signal is applied to the waveguide 102.
Figure 3:
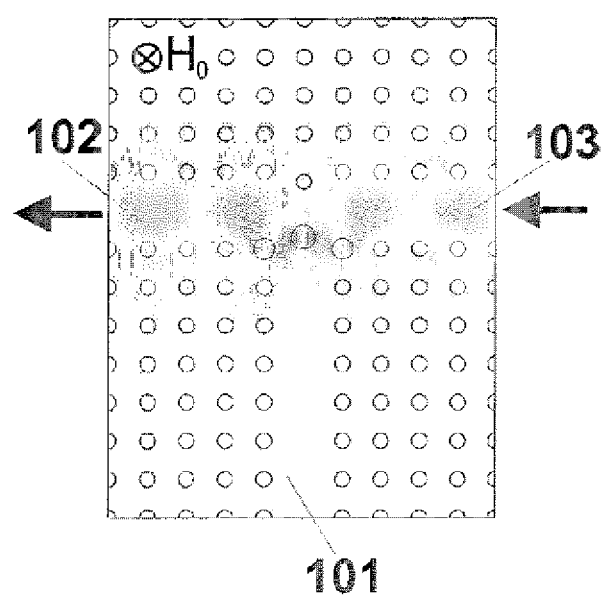
FIG. 3 shows the $E_z$ component of the electromagnetic field in the device when the input signal is applied to the waveguide 103.

In the cases illustrated in FIGS. 1 and 2, it can be seen that the stationary dipole excited in the resonant cavity mode is rotated by an angle of 45°, which provides isolation of ports 2 and 3, respectively. On the other hand, in the case illustrated in FIG. 3, it is shown that the stationary dipole mode suffers no rotation, causing the transmission of the input signal (applied to port 3) to port 2, with isolation of the port 1.

Figure 4:
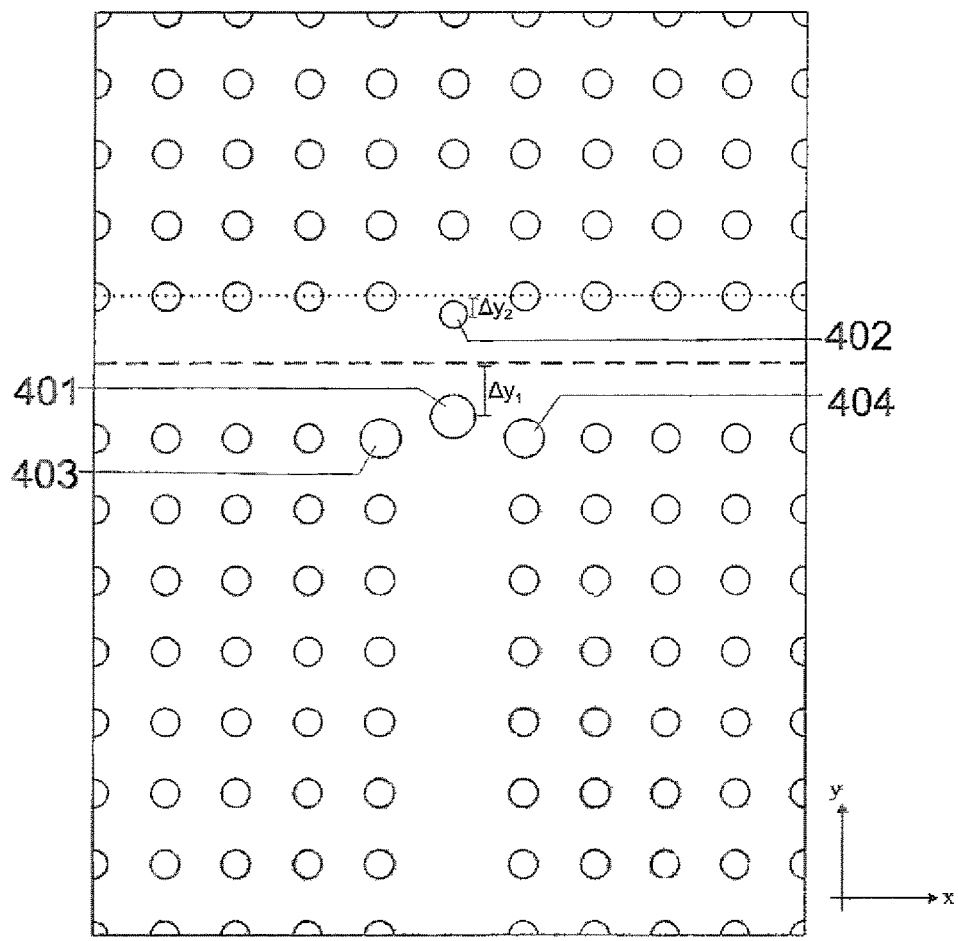
FIG. 4 shows, schematically, details of the geometry of the resonant cavity which is part of the device.

In order to obtain a higher bandwidth, adjustments were made in the central structure of the device, which can be seen in FIG. 4. The radius of the cylinder 401 was increased by 0.10562a and the offset relative to the axis of waveguides 102 and 103 (Δy1) is 0.69086a. The cylinder 402 has its radius reduced by 0.01249a and it was moved vertically, relatively to the axis of the upper cylinders (Δy2), by 0.2563a. The radii of the cylinders 403 and 404 were increased by 0.07439a.

Figure 5:
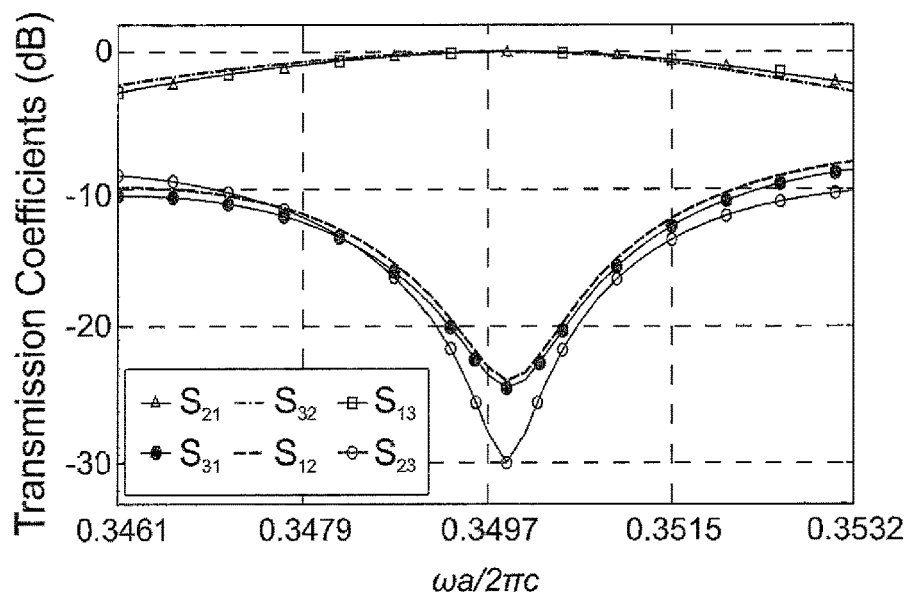
FIG. 5 shows the device frequency response.

The device's frequency response is shown in FIG. 5. At the normalized central frequency ωa/2πc=0.3499, the insertion losses are smaller than −0.05 dB, where: ω is the angular frequency (in radians per second); a is the lattice constant (in meters); c is the speed of light in free space (roughly equal to 300,000,000 meters per second). In the frequency band located around 100 GHz, the bandwidth (defined at the level −15 dB of isolation curves) is equal to 620 MHz for excitation at port 1, 680 MHz for excitation at port 2 and 730 MHz for excitation at port 3.

The invention claimed is:

1. A T-shaped circulator device based on a two-dimensional photonic crystal with a square lattice, the device comprising a two-dimensional photonic crystal in which are inserted three waveguides and a single resonant cavity and it performs a transmission of electromagnetic signals in a given direction (clockwise or counterclockwise), with the direction being determined by a sign of an external DC magnetic field applied to the device, wherein the resonant cavity has a simplified structure, consisting of a single ferrite cylinder and two cylinders near the dielectric ferrite with enlarged diameters when compared to other cylinders that make up the photonic crystal.

2. The T-shaped circulator device based on a two-dimensional photonic crystal with square lattice according to claim 1, wherein when operating at a normalized central frequency ωa/2πc=0.3499, insertion losses are lower than −0.05 dB, while a bandwidth, set to 100 GHz, is equal to 620 MHz for excitation at port a first, 680 MHz for excitation at a second port, and 730 MHz for excitation at a third port, at the level −15 dB of isolation curves.

* * * * *